United States Patent Office 3,573,950
Patented Apr. 6, 1971

---

3,573,950
PROTECTIVE COATING OF GLASS SURFACE
Joseph J. Domicone, Horseheads, N.Y., assignor to Corning Glass Works, Corning, N.Y.
No Drawing. Filed Sept. 27, 1968, Ser. No. 763,367
Int. Cl. C03c 17/28, 15/02
U.S. Cl. 117—6                                                         6 Claims

ABSTRACT OF THE DISCLOSURE

A method of preserving the wettability of a glass surface by treating the glass with an aqueous solution of gluconic acid.

---

Upon storage for any length of time, the surface of glass is well known to absorb contaminants such as oils, and other organic contaminants from air-borne lint and dirt particles. This affinity for absorbing substances from the atmosphere suggest the presence of unsatisfied valences in pristine glass surfaces. The result of this phenomena is a non-wetting glass surface. Nonwetting characteristics have been a particular problem in the manufacture of microscope cover glasses which are usually a thickness of 0.13–0.19 mm. Cutting the glass into such thin sheets has been very difficult when the glass is nonwetting. Furthermore, since the media which are placed on the microscope slides are in an aqueous solution, it is desirable that the cover glass be wet by the solution.

In accordance with the present invention, I have discovered a method of preserving the wettability of glass surfaces by coating the surface of the glass with an aqueous solution of gluconic acid and then drying the coating. Prior to applying the coating the glass surface should be clean. It is therefore most practical to apply the coating to a pristine glass surface. When the glass is to be used the protective gluconic acid coating can be removed easily by washing in hot water.

Numerous glasses can be treated with a protective coating by the method of my invention. As a general rule the more durable the glass, the greater the tendency for the surface of the glass to become nonwetting. It also follows that the less durable glasses have increased wettability, but even these glasses will in time become nonwetting. Glasses which may be treated include borosilicate glass, soda lime glass, aluminosilicate glass, lead alkali silicate glass and the like.

Gluconic acid may be represented by the formula $C_6H_{12}O_7$. It is produced commercially by the fermentative oxidation of the aldehyde group in glucose from corn using *Aspergillus niger*. The acid is freely soluble in water, slightly soluble in alcohol, insoluble in ether and most other organic solvents. Because of the difficulties of preparing a solid crystalline product, gluconic acid is available as a 50% aqueous solution. For the purposes of this invention, the treating solution should contain 1–50% by weight of gluconic acid in an aqueous solution. The pH of the solution varies from about pH 2.2 (50% solution) to pHO 3.2 (1% solution). The preferred coating solution contains about 3–5% by weight of gluconic acid. The temperature of the treating solution is preferably 50–100° C.

My invention is further illustrated by the following example.

EXAMPLE

A glass was prepared and melted to form the following composition as calculated in weight on the oxide basis.

| Ingredient: | Wt. percent |
|---|---|
| Silica | 64.3 |
| Alumina | 2.0 |
| Boric oxide | 9.2 |
| Sodium oxide | 6.5 |
| Potassium oxide | 7.6 |
| Zinc oxide | 7.0 |
| Titanium oxide | 3.4 |

Samples of the glass were formed into 4" x 4" squares. The samples were initially cleaned by dipping into a 2% solution of hydrofluoric acid and washed with distilled water. The dried samples were then immersed into a 3% by weight aqueous solution of gluconic acid at a temperature of 75–80° C. for about 15 seconds. The sample was air dried and stored.

Thereafter at various intervals the protective gluconic acid coating was removed from the glass by washing with hot water. It appeared that the treated glass remained wettable even after four months of storage.

Other samples of the glass, freshly formed, were immediately immersed into a 5% by weight aqueous solutoin of gluconic acid at a temperature of 75–80° C. These samples were air dried for about one minute and the slightly tacky samples were conventionally stored. At intervals the coatings were removed with hot water, rinsed with cold water and air drying. These samples also retained nonwetting properties for many months.

It will be apparent to those skilled in the art that many vraiations and modifications of the invention as hereinabove set forth may be made without departing from the spirit and scope of the invention. The invention is not limited to those details and applications described except as set forth in the appended claims.

I claim:
1. A method of preserving the wettability of surfaces of a glass article comprising the steps of:
   (a) coating the glass surfaces with a 1–50% by weight aqueous solution of gluconic acid, and
   (b) drying said coating.
2. The method of claim 1, wherein said aqueous solution contains 3–5% by weight of gluconic acid.
3. The method of claim 1, wherein said glass surfaces are cleaned prior to said coating.
4. The method of claim 1, wherein said glass is a member selected from the group consisting of borosilicate, glass, soda lime glass, aluminosilicate glass and alkali silicate glass.
5. The method of claim 1, wherein the coating is subsequently removed with water prior to using said article.
6. The method of claim 1, wherein the coating step is at a temperature of 50–100° C.

References Cited

UNITED STATES PATENTS

| 2,785,989 | 3/1957 | Davis et al. | 106—243 |
| 2,824,411 | 2/1958 | Goodwillie et al. | 117—6 |
| 2,991,189 | 7/1961 | Rickert | 117—6 |

ALFRED L. LEAVITT, Primary Examiner

M. F. ESPOSITO, Assistant Examiner

U.S. Cl. X.R.

117—124, 126